(12) United States Patent
Salah et al.

(10) Patent No.: US 12,167,949 B2
(45) Date of Patent: Dec. 17, 2024

(54) METHOD FOR EVALUATING AN ORTHODONTIC ALIGNER

(71) Applicant: DENTAL MONITORING, Paris (FR)

(72) Inventors: Philippe Salah, Paris (FR); Thomas Pellissard, Maisons-Alfort (FR); Guillaume Ghyselinck, Cantin (FR); Laurent Debraux, Paris (FR)

(73) Assignee: DENTAL MONITORING, Paris (FR)

( * ) Notice: Subject to any disclaimer, the term of this patent is extended or adjusted under 35 U.S.C. 154(b) by 526 days.

(21) Appl. No.: 17/604,936

(22) PCT Filed: Apr. 24, 2020

(86) PCT No.: PCT/EP2020/061499
§ 371 (c)(1),
(2) Date: Oct. 19, 2021

(87) PCT Pub. No.: WO2020/216925
PCT Pub. Date: Oct. 29, 2020

(65) Prior Publication Data
US 2022/0202532 A1    Jun. 30, 2022

(30) Foreign Application Priority Data

Apr. 24, 2019 (FR) ...................... 1904306

(51) Int. Cl.
*A61C 7/08* (2006.01)
*A61C 7/00* (2006.01)

(52) U.S. Cl.
CPC ............... *A61C 7/08* (2013.01); *A61C 7/002* (2013.01)

(58) Field of Classification Search
None
See application file for complete search history.

(56) References Cited

U.S. PATENT DOCUMENTS 10,606,911 B2 *  3/2020  Elbaz ..................... A61C 1/088
10,937,160 B1 *  3/2021  Ricci .................. G06Q 30/0631
(Continued)

FOREIGN PATENT DOCUMENTS

EP    1570803 A2    9/2005
EP    3412245 A1   12/2018
(Continued)

OTHER PUBLICATIONS

International Search Report corresponding to International Application No. PCT/EP2020/061499 dated Jul. 24, 2020, 10 pages.

*Primary Examiner* — Tapas Mazumder
(74) *Attorney, Agent, or Firm* — Ronald M. Kachmarik; Cooper Legal Group LLC

(57) ABSTRACT

A method for evaluating, by computer, at an "updated" time, the conformity of an orthodontic aligner with a dental arch of a patient, referred to as the "support arch." The method includes the following successive steps: A) producing a digital three-dimensional model of the support arch in its configuration at the updated time, or an "updated reference model", and determining from the updated reference model, a support surface for the aligner; B) deforming the support surface on the basis of the geometry of the aligner in order to obtain a deformed support surface; C) comparing an external surface of the aligner with the deformed support surface, then determining, on the basis of the comparison, at least one score for the conformity of the aligner with the support arch.

18 Claims, 6 Drawing Sheets

(56) References Cited

U.S. PATENT DOCUMENTS

| | | |
|---|---|---|
| 2007/0128573 A1 | 6/2007 | Kuo |
| 2011/0236849 A1* | 9/2011 | Pogorelsky ............. A61C 7/00 |
| | | 433/74 |
| 2014/0204118 A1 | 7/2014 | Berry et al. |
| 2014/0368378 A1* | 12/2014 | Crain .................... H01Q 15/14 |
| | | 342/25 A |
| 2019/0102880 A1 | 4/2019 | Parpara et al. |

FOREIGN PATENT DOCUMENTS

| | | |
|---|---|---|
| EP | 3432267 A1 | 1/2019 |
| KR | 101930062 B1 | 3/2019 |
| WO | 2016066651 A1 | 5/2016 |
| WO | 2016066652 A1 | 5/2016 |
| WO | 2016066654 A1 | 5/2016 |

\* cited by examiner

[Fig 1]
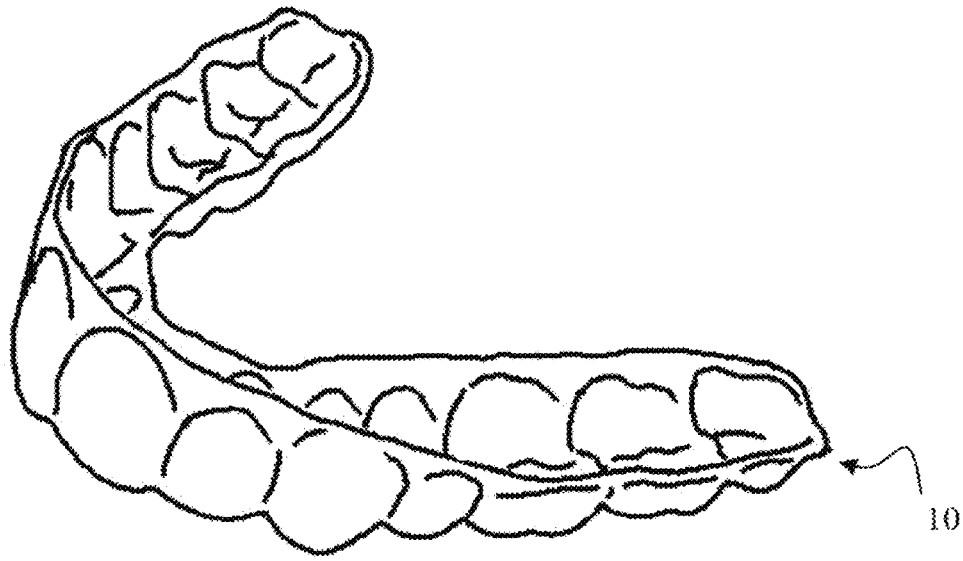
[Fig 2]
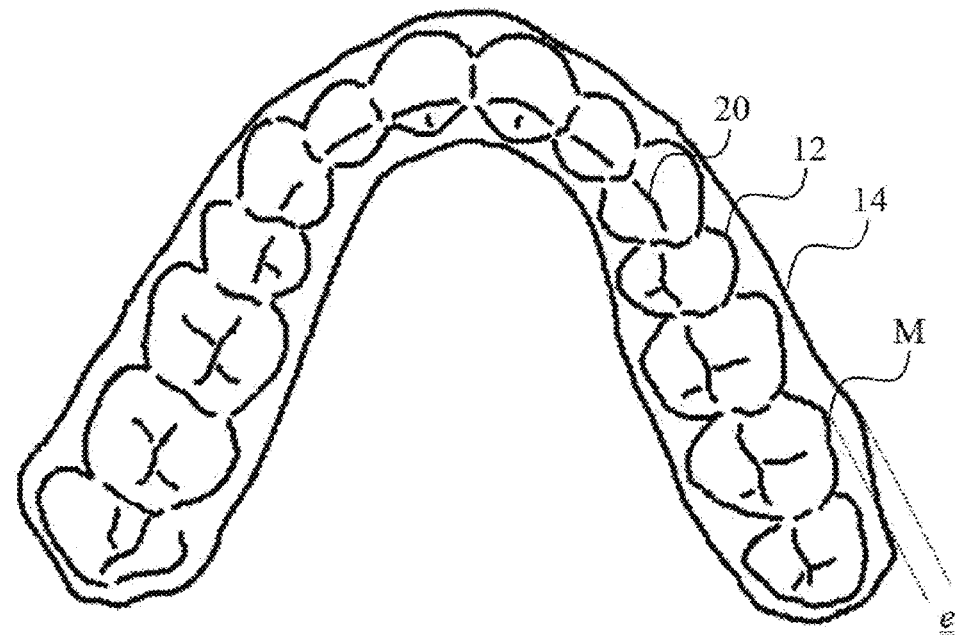

[Fig 3]
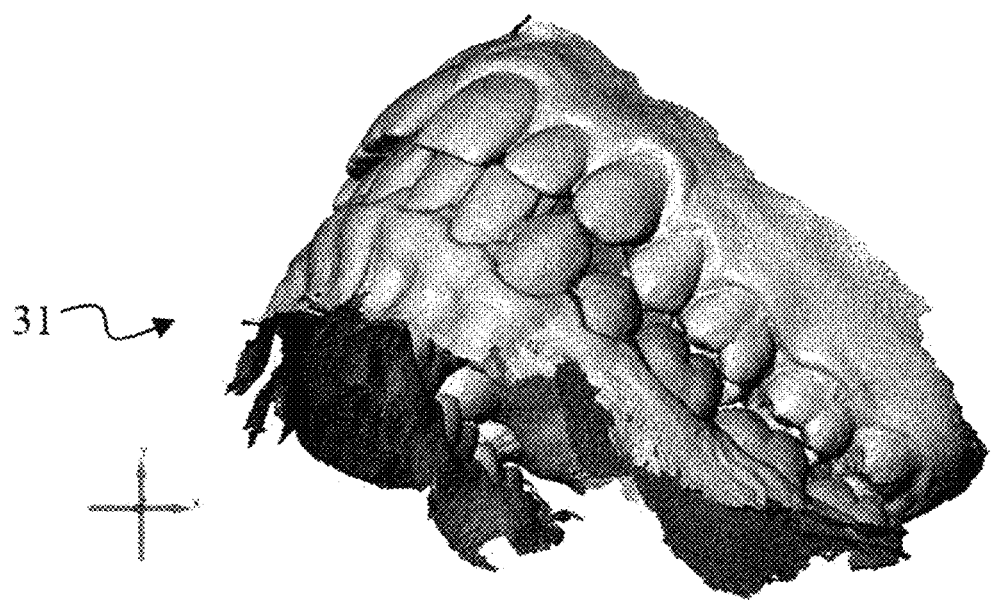
[Fig 4]
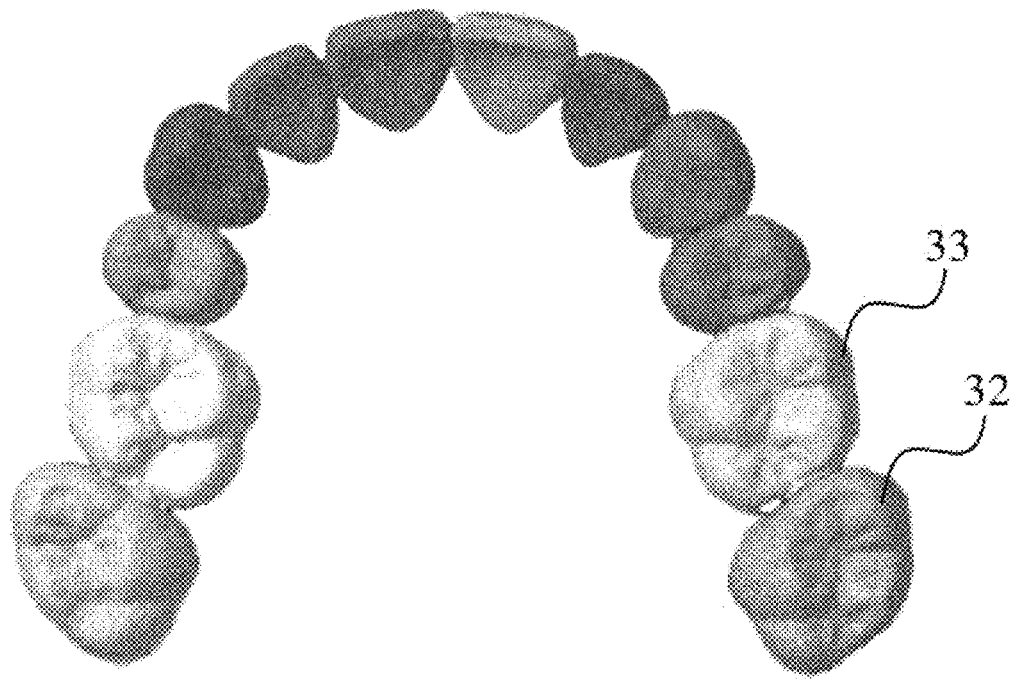

[Fig 5]
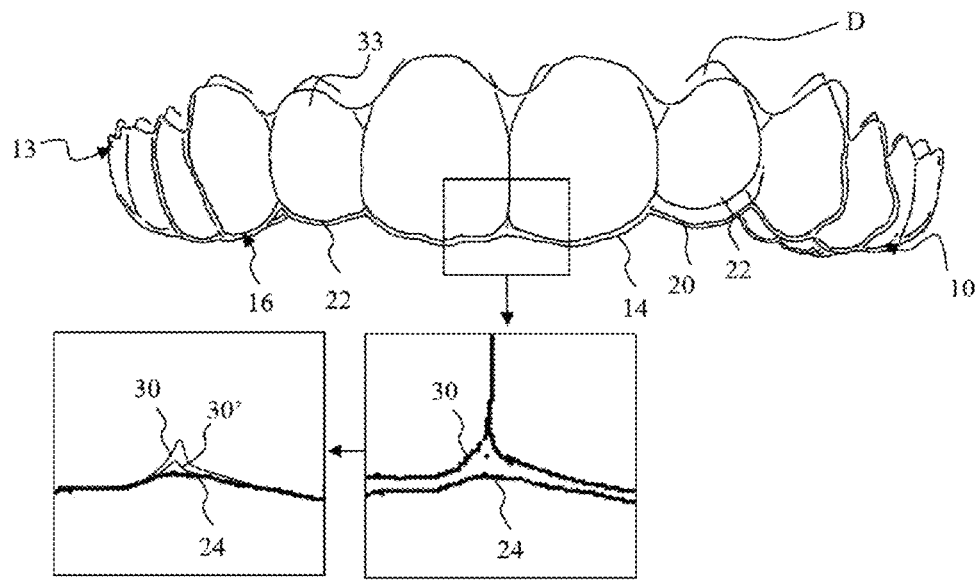
[Fig 6]
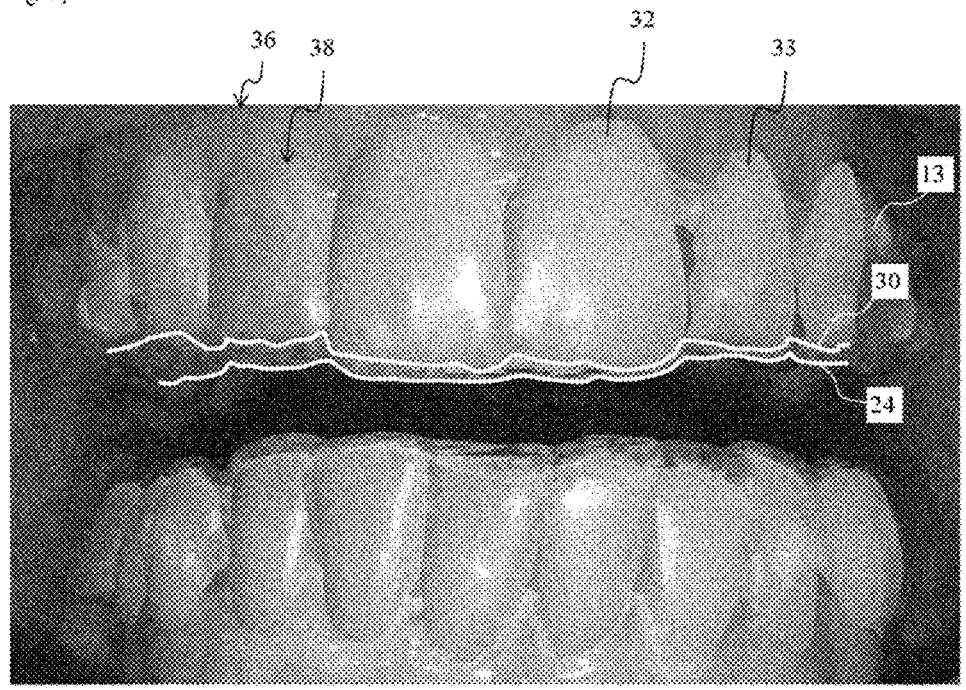

[Fig 7]
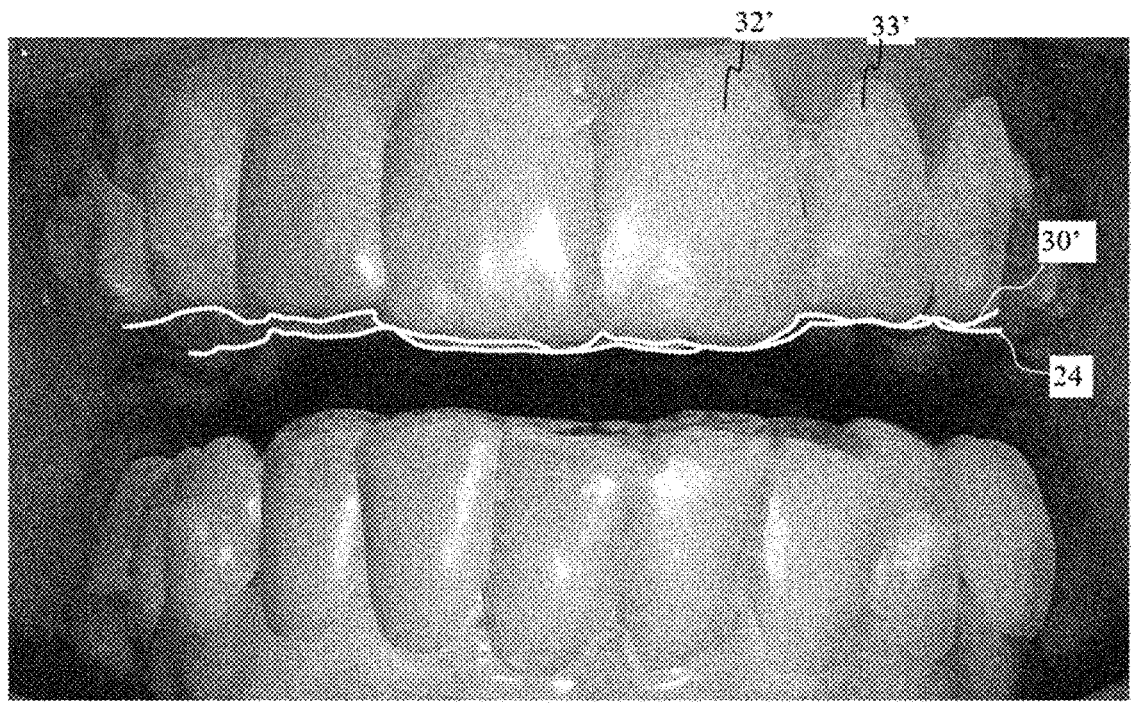
[Fig 8]
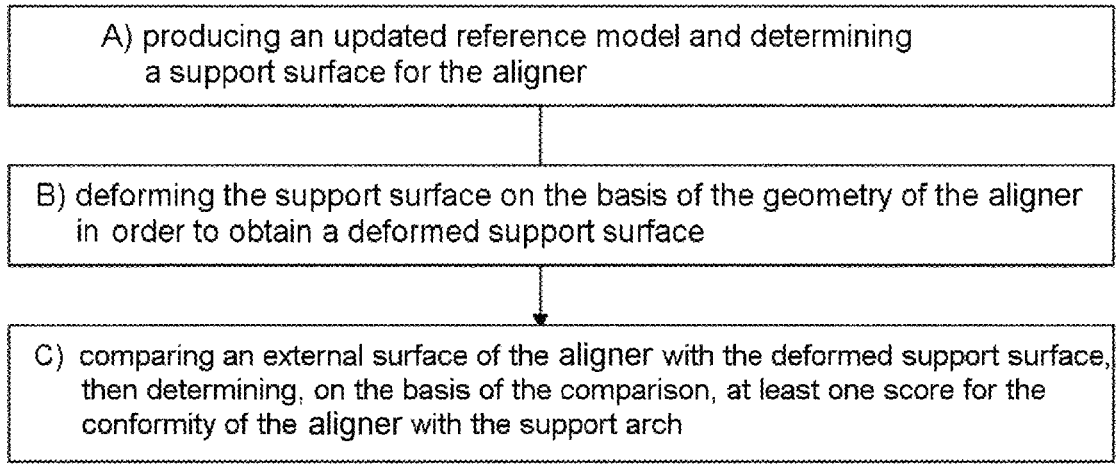

[Fig 9]

Determining an aligner contour represented in an aligner image
Producing an updated reference model by modifying
tooth models of an initial reference model
Seeking framed observation conditions offering a framed view
of the updated reference model compatible with the aligner image Deforming the tooth models of the updated reference model
by overthickening and determining a deformed support contour
represented in a view of the deformed updated reference model
observed under the framed observation conditions Comparing the aligner exterior contour represented in the aligner
image with the deformed support contour

[Fig 10]

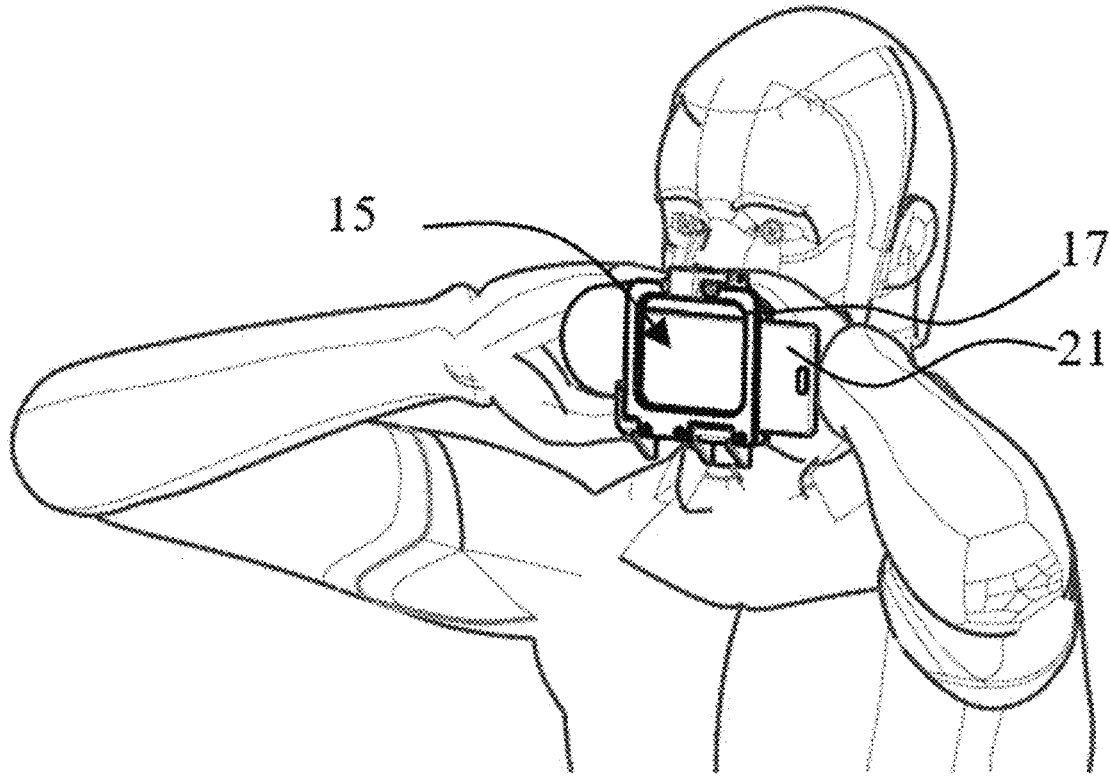

[Fig 11]
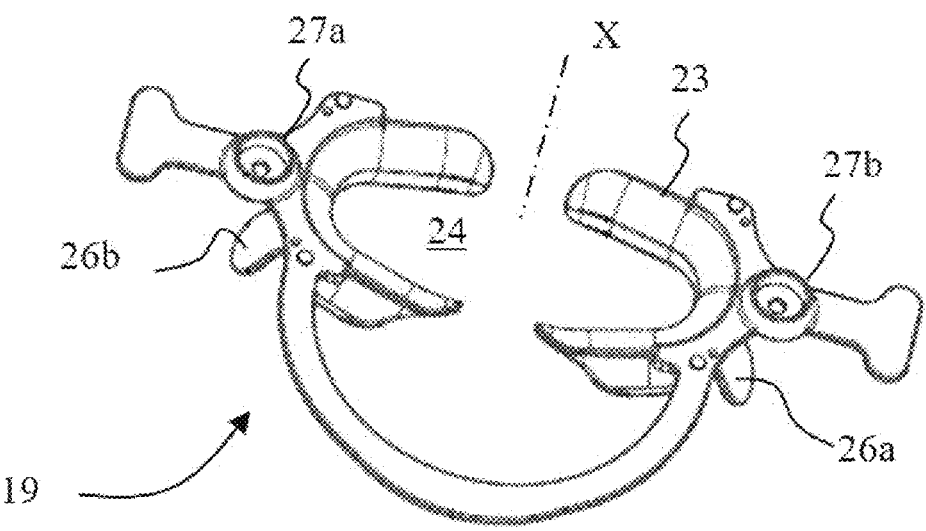
[Fig 12]
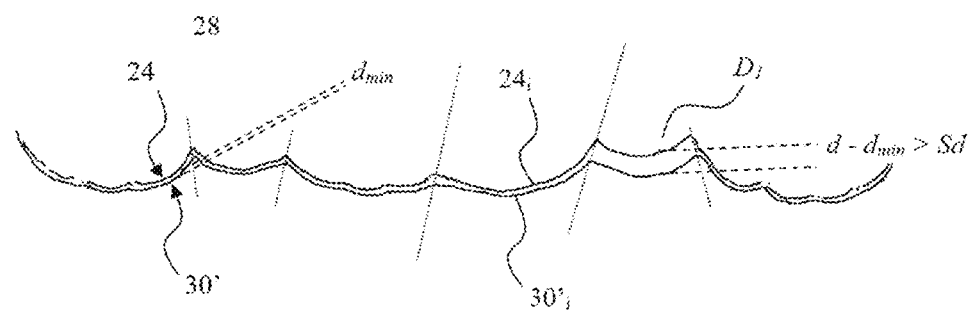
[Fig 13]
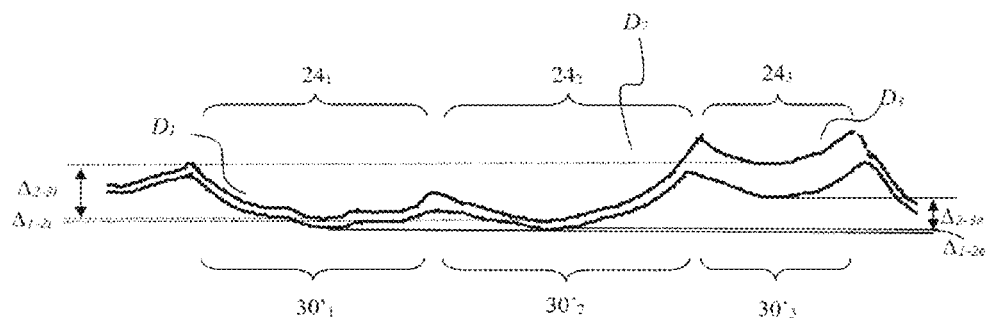

METHOD FOR EVALUATING AN ORTHODONTIC ALIGNER

TECHNICAL FIELD

The present invention concerns a method for evaluating the conformity of an orthodontic aligner worn by a patient, in particular to evaluate the conformity of the shape of the orthodontic aligner to the positioning of the teeth of said patient. The invention also concerns a method of adapting a treatment by means of orthodontic aligners.

The invention finally concerns a computer program for the execution of those methods.

PRIOR ART

Conventionally, at the commencement of an orthodontic treatment, the orthodontist determines the positioning of the teeth that they wish to obtain at a treatment, or so-called set-up time. The set-up may be defined by means of an impression or on the basis of a three-dimensional scan of the teeth of the patient. The orthodontist then accordingly manufactures an orthodontic device suitable for that treatment.

The orthodontic device may be an orthodontic aligner. An aligner conventionally takes the form of a removable one-piece device, conventionally made of a transparent polymer material that includes a channel conformed so that a plurality of teeth of an arch, generally all the teeth of an arch, can be housed therein.

The shape of the channel is adapted to hold the aligner in position on the teeth, whilst exerting an action correcting the positioning of certain teeth.

At the commencement of the treatment the shapes that the various aligners must assume at different times in the treatment are determined conventionally, after which all of the corresponding aligners are manufactured. The patient changes aligner at predetermined times.

The treatment by means of aligners is advantageously relatively unconstraining for the patient. In particular, the number of appointments with the orthodontist is limited. Moreover, the discomfort is less than with a metal orthodontic brace attached to the teeth.

At regular intervals the patient visits the orthodontist for a visual inspection, in particular to verify if the movement of the teeth conforms to expectations and if the aligner that they are wearing is still suitable for the treatment.

If the orthodontist diagnoses an unsuitability for treatment, and in particular unseating of the aligner, they make a new impression of the teeth or, in an equivalent manner, a new scan of the teeth, and then order a new series of aligners configured accordingly.

The necessity of having to visit the orthodontist is a constraint for the patient. The confidence of the patient in their orthodontist may also be damaged. Finally, this results in an additional cost. The number of inspection visits to the orthodontist must therefore be limited.

The unsuitability of an aligner may equally be unesthetic.

To solve these problems the Applicant has proposed, in EP3412245, a method of evaluating the shape of an orthodontic aligner worn by a patient.

That method considerably facilitates evaluating the suitability of the aligner for the treatment. In particular, it may be based on simple photographs or videos taken with no particular precautions, for example by the patient. The number of appointments with the orthodontist can therefore be limited.

The method described in EP3412245 is based on comparing contours of the teeth and of the aligner in the photos. It may however provide erroneous information if those contours are difficult to distinguish in the photos.

There exists a need for a solution addressing this problem.

One aim of the invention is to respond at least partially to that need.

DESCRIPTION OF THE INVENTION

Summary of the Invention

The invention provides a method of evaluation, by computer, at a so-called "updated time", of the conformity of an orthodontic aligner to a dental arch of a patient, referred to as the "support arch", said method including the following successive steps:

A) producing a digital three-dimensional model of the support arch, in its configuration at the updated time, or an "updated reference model", and determining, in the updated reference model, a support surface of the aligner;

B) deforming the support surface, as a function of the geometry of the aligner, of the support surface to obtain a deformed support surface;

C) comparing an exterior surface of the aligner with said deformed support surface, followed by the determining, as a function of said comparison, at least one score of conformity of the aligner to the support arch.

As will emerge in more detail in the remainder of the description, the invention does not seek to compare the support surface with the interior surface of the aligner on which the teeth of the patient should bear in the service position. In a remarkable manner, a deformed support surface is determined from the support surface and from the geometry of the aligner, after which that deformed support surface is compared to the exterior surface of the aligner. A method in accordance with the invention therefore uses the exterior surface of the aligner to evaluate any unseating of the interior surface of the aligner from the teeth. The exterior surface of the aligner is advantageously easily identifiable in representations of the aligner.

This improves the reliability of the comparison.

Step A)

The updated reference model may be produced using a scanner.

An "updated tooth model" is a tooth model in the updated reference model.

In a particularly advantageous embodiment, at an initial time before the step A) an initial reference model is created and the initial reference model is in such a manner as to define, for each tooth represented in the initial reference model, a digital three-dimensional reference model of said tooth, or an "initial tooth model". Thereafter, at the updated time, the initial tooth models are moved to produce the updated reference model. The movement is preferably optimized to obtain an updated reference model compatible with at least one updated image of the support arch acquired less than one month, one week, one day or one hour before the updated time.

The updated tooth models are then initial tooth models, that may have moved.

The initial time may in particular be at the commencement of the orthodontic treatment including the use of the orthodontic aligner. In one embodiment the time interval between the initial time and the commencement of the orthodontic treatment of the patient is less than one month or than one week.

The updated time is during an orthodontic treatment with aligners. The time interval between the updated time and the initial time may therefore be greater than one week, one month or three months.

The initial reference model is preferably produced using a scanner, offering high precision.

The updated image, preferably a photo, may be acquired with a mobile telephone, for example by the patient themselves. The movement of the initial tooth models advantageously makes it possible to end up with an updated reference model that is also very precise, corresponding to the configuration of the teeth at the updated time, but on the basis of only the updated image or images, and therefore without having to carry out a new scan. The method can therefore be executed without having to make an appointment with the orthodontist.

Step B)

At a point on the support surface, preferably at least at any point of the part of the support surface that defines the free edges of the tooth models, preferably at any point on the support surface, said deformation is preferably determined as a function of the distance between the interior and exterior surfaces of the aligner at a point on the interior surface of the aligner intended, in the service position, to be in contact with said point on the support surface. Said deformation is preferably a proportional deformation, preferably with an amplitude substantially equal to said distance.

The local deformation of the support surface is preferably determined as a function of the local thickness of the aligner. The local thickness of the aligner is known to the manufacturer since the manufacture of the aligner necessitates a knowledge of the dimensional characteristics thereof. Although this embodiment is not preferred, the local thickness may also be measured or determined approximately, for example by calculating the average local thickness for a set of comparable aligners.

In one embodiment the deformation is of constant amplitude at all points on the support surface.

In the step B) the support surface, preferably at least the part of the support surface that defines the free edges of the teeth of said arch, is preferably deformed in such a manner that the deformed support surface extends substantially along the exterior surface of the representation of the aligner if that aligner were modeled in the updated reference model in the service position, in the absence of unseating of the aligner.

The deformation of the support surface preferably reproduces the transformation that links it to the exterior surface of the aligner from the interior surface of the aligner. In particular, the deformation preferably comprises a swelling of the support surface with an amplitude substantially equal to said distance between the interior and exterior surfaces of the aligner, preferably substantially equal to that distance, at least in the part of the interior surface that defines the free edges of the tooth models. For example, if the aligner is of constant thickness "e", the deformation is that which would be obtained by a swelling of the teeth for the overthicknesses of an overthickness "e".

In a preferred embodiment, in the step A), the updated reference model is divided in such a manner as to define, for each tooth represented in the updated reference model, an "updated tooth model". The support surface is then defined by the surfaces of the updated tooth models. In the step B) the surface of each updated tooth model is deformed to obtain a deformed tooth model, after which the deformed tooth models are merged and the deformed support surface is defined as being at least a part of, or even all of, the envelope of the assembly consisting of the merged deformed tooth models. The deformation of the surface of an updated tooth model is preferably a swelling of the updated tooth model, preferably of constant amplitude, preferably greater than 0.5 mm and/or less than 5 mm, than 4 mm or than 2 mm, and/or is, at a point on the surface of the updated tooth model, determined as a function of the distance between the interior and exterior surfaces of the aligner at a point on the interior surface of the aligner intended, in the service position, to be in contact with said point on the surface of the updated tooth model. The amplitude of said deformation at said point on the surface of an updated tooth model is preferably proportional to, preferably substantially equal to, said distance.

In an embodiment preferred amongst all embodiments,
 in the step A), an image of the aligner is taken at the updated time, in a service position in which it is carried by said support arch, or "aligner image",
 a contour of the exterior surface of the aligner, or a "aligner exterior contour", represented in the aligner image, is determined
 and "framed" observation conditions are sought offering a view of the updated reference model compatible with the aligner image, that is to say showing maximum agreement with the representations of the teeth in the aligner image,
 in the step B) the support surface is deformed, the updated tooth models are preferably made to swell, preferably by a constant amplitude, and
 in the step C), the aligner exterior contour is compared with a contour of the deformed support surface, or "deformed support contour" represented in a view of the deformed updated reference model observed under the framed observation conditions.

The exterior contour of the aligner has the advantage of generally being clearly visible in the aligner image. The inventors have discovered that this exterior contour can be very substantially different from the contour of the free edges of the teeth covered by the aligner and along which it extends. On the other hand, after simulation, on the updated reference model of a thickening of the teeth, all of the tooth models that have swelled define a deformed support surface that is comparable with the aligner exterior surface, at least in the vicinity of the free edges of the teeth.

In particular, observation under identical conditions of the deformed support surface and the aligner exterior surface enables definition of a deformed support contour and an aligner contour, respectively, the differences of which enable evaluation of the conformity, that is to say detection of unseating of the aligner.

It may for example be deduced that, if the deformed support contour is substantially identical to the exterior contour of the aligner, the aligner bears on the teeth in the region of those contours. The distance between those contours or the variation of that distance along those contours may in contrast indicate abnormal unseating of the aligner.

The aligner image, preferably a photo, is preferably acquired using a mobile telephone. The evaluation is therefore possible on the basis of a simple aligner image, for example a photo taken by the patient, for example with their mobile telephone. The method can therefore be executed in a reliable manner on the basis of simple photographs or videos taken with no particular precautions, for example by the patient. The number of appointments with the orthodontist can therefore be limited.

The aligner image may serve as an updated image for moving the tooth models of an initial reference model in order to produce the updated reference model.

Step C)

In the step C), a representation of said exterior surface is preferably positioned relative to the deformed support surface in such a manner as to superimpose in register at least one region of said representation with said deformed support surface, said region being a region covering, in the service position, at least one tooth of the support arch not unseated from the aligner, after which the conformity score is determined as a function of the distance between the representation of said exterior surface positioned in this way and the deformed support surface.

An elementary conformity score is likewise preferably determined for each of at least some of the teeth represented, at least partially, by the support surface, preferably for each of said teeth, and the score of conformity of the aligner to the support arch is determined as a function of said elementary conformity score or scores. In one embodiment the score of conformity of the aligner to the support arch is equal to an elementary conformity score.

In one embodiment, in the step C), the conformity score is determined by means of a neural network. The neural network may in particular be chosen from the list hereinafter.

The step C) preferably includes the following steps:
i) determining a distance between the deformed support contour and the exterior contour of the aligner;
ii) determining the conformity score as a function of the distance between said contours.

Said distances may be measured in pixels.

The method preferably includes, in the step C), an operation of comparing the conformity score to an acceptability threshold and preferably sending information as a function of the result of the comparison.

Before comparing the aligner exterior contour and the deformed support contour there are preferably superimposed in register the representation of an element on the updated image and the representation of said element on the aligner image, the element being an element not modified by wearing the aligner, preferably a gum contour.

The evaluation method is preferably executed by computer, in particular the steps of modifying a model, of calculating or exploring a model, in particular to seek a framed view, or of analyzing images or views to seek contours.

The evaluation method is executed "by computer" because a computer is employed to carry out at least partially some of its steps.

The invention also concerns:
a computer program, and in particular a dedicated application for mobile telephones, comprising program code instructions for the execution of one or more, preferably both of the steps B) and C), and preferably step A), when said program is executed by a computer,
a computer medium on which a program of this kind is stored, for example a memory or a CD-ROM, and
a personal device, in particular a mobile telephone or a tablet, into which a program of this kind is loaded.

The invention also concerns a system including:
a three-dimensional scanner able to produce an initial reference model or an updated reference model, and
a personal device, preferably a mobile telephone, loaded with a program comprising program code instructions for the execution of one or more, preferably both steps B) and C), and/or, in the step A), for generating an updated reference model from an initial reference model, when said program is executed by a computer.

The invention also concerns a method for adapting an orthodontic treatment, in which method an evaluation method in accordance with the invention is used, after which a new aligner is manufactured as a function of the result of said evaluation.

An orthodontic treatment may be therapeutic and/or esthetic.

The invention finally concerns a method of manufacturing an orthodontic aligner, in which method there is employed a method according to the invention of evaluating a first aligner, after which, as a function of said evaluation, a second aligner is manufactured.

Definitions

By "dentition" is meant a set of teeth.

By "patient" is meant any person for whom a method in accordance with the invention is carried out, whether that person is ill or not.

The "acquisition conditions" specify the position and the orientation in space of an image acquisition device relative to the teeth of the patient (real acquisition conditions) or to a three-dimensional model of the teeth of the patient (virtual acquisition conditions), and preferably the calibration of that image acquisition device, and in particular the values of the aperture, the exposure time, the focal distance and the sensitivity. Acquisition conditions are termed "virtual", or "theoretical", if they correspond to a simulation in which the image acquisition device would be under said acquisition conditions (theoretical positioning and preferably theoretical calibration of the acquisition device).

The "observation conditions" specify the conditions under which a model is observed. If the observation is effected by an acquisition device to acquire an image the observation conditions are "acquisition conditions".

By "model" is meant a digital three-dimensional model. A model consists of a set of voxels. An "arch model" is a model representing at least a portion of the dental arch, preferably at least two, preferably at least three, preferably at least four teeth.

An aligner "support surface" is a surface that models partially or completely the surface of a dental arch on which the aligner bears in the service position. It may be but is not necessarily limited to the surface on which the aligner bears in the service position. In particular, it may consist of the surface that models the teeth.

The "support" arch is the dental arch that supports the aligner, that is to say to which the dental arch is fixed.

The "deformation" of the support surface is an operation of modifying the shape of that surface. After deformation the surface can therefore no longer be perfectly superimposed on the surface before deformation. A mere movement of the support surface in space is therefore not a deformation. For example, a movement of a tooth model, as described for example in EP 3 412 245, does not lead to a deformation of the surface of that tooth model.

A 3D scanner is a device enabling a model of an object to be obtained.

An observation of a model under particular observation conditions, in particular at a particular angle and a particular distance, is termed a "view".

By "image" is meant a two-dimensional image such as a photograph. An image is formed of pixels.

By "arch view", "arch representation", "arch scan" or "arch model" is meant a view, a representation, a scan or a model of all or part of said dental arch.

A three-dimensional digital model of a set of teeth of a patient is "compatible" (or "features a maximum agreement") with an image if there exists a view of that model that corresponds to said image, that is to say that the teeth of said model are positioned relative to one another like the real teeth that they model. An updated reference model is therefore compatible with an updated image if a view of the updated reference model enables observation of the contours of the tooth models in such a manner that they can be superimposed in register with the contours of said teeth in said updated image.

In an analogous manner, a view of a model may be considered "compatible" or "superimposable in register" with an image if it features a maximum agreement with the image. Obtaining a maximum agreement may in particular result from an operation of optimization or from the use of a neural network.

The simulation of a thickness of a tooth is an operation by which is simulated the addition to the exterior surface of the tooth of a layer of material or "overthickness". The "exterior surface" of the tooth is the surface of the tooth exposed to the environment of the mouth, which excludes the roots of the tooth. The thickening of a tooth therefore does not lead to moving the limit between the gum and the tooth toward the free edge of the tooth.

The simulation of an overthickness of a tooth executed on a model of that tooth produces a "swelling" of that tooth model.

The simulation of an overthickness of a plurality of teeth is an operation whereby there is simulated the addition of an overthickness to the exterior surface of each of the teeth, ignoring the physical interactions between the adjacent teeth. The simulation of a thickening of a plurality of teeth is performed by means of a model of the arch, each tooth model of the arch model being swollen in such a manner as to reflect the thickening of the modeled tooth.

If two tooth models are side-by-side, the swelling thereof may lead to interpenetration of those tooth models.

The "geometry" of an object is conventionally defined by all of its dimensional characteristics. The geometry of an object therefore corresponds to its shape. It determines in particular the local thickness of that object.

The "service position" is the position in which the aligner is worn by the patient.

"Comprise", "include" or "feature" must be interpreted broadly and in a nonlimiting manner unless otherwise indicated.

The adjectives "initial" and "updated" are used for clarity, and in particular to distinguish a so-called "updated" time and a so-called "initial" time, or the "updated" and "initial" reference models that represent the dental arch in its configuration at the updated and initial times, respectively.

BRIEF DESCRIPTION OF THE FIGURES

Other features and advantages of the invention will become more apparent on reading the following detailed description and examining the appended drawings, in which:

FIG. 1 represents a perspective view of an orthodontic aligner;

FIG. 2 represents a view from above of the orthodontic aligner from FIG. 1;

FIG. 3 represents an example of a reference model;

FIG. 4 represents an example of an initial reference model in which the tooth models have been divided (only the tooth models are represented);

FIG. 5 schematically represents a support arch carrying an orthodontic aligner;

FIG. 6 represents a superimposition in register of an aligner image, in the form of a photo, and of a framed view of an updated reference model, the representations of the teeth in the aligner image having a maximum agreement with the representations of the teeth in this view;

FIG. 7 represents the superimposition from FIG. 6 after deformation of the tooth models by swelling;

FIG. 8 illustrates schematically a method according to the invention in a preferred embodiment;

FIG. 9 illustrates schematically a method in accordance with the invention;

FIG. 10 illustrates schematically the acquisition of an aligner image;

FIG. 11 illustrates schematically a spreader that can be used with the acquisition kit represented in FIG. 10;

FIG. 12 illustrates an example of implementation of the steps i) to iii) for a step C);

FIG. 13 illustrates an example of execution of the steps i') to iii') for a step C).

DETAILED DESCRIPTION

As represented in FIG. 1, an aligner 10 extends in such a manner as to follow the successive teeth of the support arch onto which it is fixed. It defines an aligner of "U" general shape.

"Channel" designates the interior surface 12 of the aligner, oriented toward the teeth in the service position. The shape of the channel is determined so as to fix the aligner onto the teeth, but also as a function of a target positioning required for the teeth. To be more precise, the shape is determined in such a manner that, when the aligner is in its service position, it exerts forces tending to move the treated teeth toward their target positioning.

The teeth that carry the aligner in the service position are part of the support arch 13 of the aligner.

The exterior surface 14 is the surface opposite the interior surface 12. It is oriented toward the cheeks and the lips in the service position.

The material of the aligner separating the exterior surface 14 and the interior surface 12 of the aligner at a point M on the interior surface defines the thickness "e" of the orthodontic aligner. That thickness can be seen in FIG. 3. The aligner may have a varying or substantially constant thickness.

In the region of the free edges of the teeth the thickness is conventionally substantially constant. The exterior surface 14 of the aligner, which extends parallel to the bottom 20 of the channel, therefore generally appears to be of substantially the same shape as the bottom of the channel.

In accordance with the invention, the shape of the aligner is evaluated by comparing the exterior surface of that aligner, in its service position, with the surface of a model of the dental arch, or "support surface" 33, that has been deformed as a function of the geometry of the aligner, or "deformed support surface" 33.

In a preferred embodiment this evaluation is effected by comparing representations of these surfaces in images. In particular, an exterior contour of the aligner represented in an aligner image, preferably a photo, is compared with a "deformed support contour" defined by observation of the deformed reference model.

The bottom 20 of the channel has a shape substantially complementary to that of the free edges 22 of the teeth. Consequently, in an image representing the bottom of the channel, the contour of the bottom of the channel may be compared to a contour of the teeth to evaluate a distance between the bottom of the channel and one or more teeth free edges. In an image, in particular in a photo, the contour of the bottom of the channel is however often difficult to distinguish, in particular because the aligner is not perfectly transparent and may deform the path of the light.

Unlike the channel, the exterior surface 14 of the aligner has the advantage of being clearly visible in the images, and in particular in the photos. However, as illustrated in FIG. 5, the exterior surface 14 is not the result of a simple homothetic relationship of the bottom of the channel. The exterior surface 14 shape may therefore depart substantially from that of a surface that would be identical to that of the channel, in particular in the regions between the teeth.

In an image the contour of the exterior surface 14 of the aligner, or "aligner exterior contour" 24, therefore does not define precisely the contour of the bottom of the channel A comparison between the gutter exterior contour 24 and the contour of the free edges of the teeth that carry the aligner, or "support contour" 30 (FIG. 5), therefore does not enable a completely reliable conclusion as to any unseating of the teeth from the bottom of the channel.

The object of the method of the invention is to detect, from the aligner exterior contour, which is generally clearly visible, situations in which the free edge 22 of a tooth is no longer in contact with the bottom of the channel, and preferably to measure the magnitude of that unseating.

The method is used when the patient has to verify the conformity of the aligner that they are wearing with the intended treatment, for example more than two weeks and more than four weeks after the commencement of the treatment with the aligner.

At least one reminder advising the patient of the necessity to carry out the method is preferably sent to the patient. That reminder may be in paper form or preferably in electronic form, for example in the form of an email, automatic alerting of a mobile dedicated application, or an SMS message. A reminder of this kind may be sent by the surgery or the orthodontic laboratory or by the dentist or by a dedicated application on the mobile telephone of the patient, for example.

In accordance with one embodiment of the invention the aligner exterior contour 24 is not compared to the support contour or to the contour of the bottom of the channel, but to a deformed support contour 30' (FIG. 5) determined from the support contour 30, as described in detail hereinafter.

In the step A), an updated reference model 31 (FIG. 3) is first produced to model the arch that carries or is intended to carry the aligner at the time of the evaluation, termed the "updated time".

Production of the Updated Reference Model

The updated reference model may be produced by any means. The updated reference model is then divided to define "updated" tooth models, as described hereinafter for the initial reference model.

To limit the number of appointments with the orthodontist the updated reference model is in fact preferably created from an initial reference model.

The initial reference model is produced at an initial time, preferably less than six months, preferably less than three months or less than one month or less than two weeks after or before the commencement of the orthodontic treatment applied to the patient.

The initial reference model is for example of the .stl or .Obj, .DXF 3D, IGES, STEP, VDA, or clouds of points type. A model of this kind, termed a "3D" model, can advantageously be observed from any angle.

The initial reference model may be prepared from measurements on the teeth of the patient or on a physical model of their teeth, for example a plaster model.

The initial reference model is preferably created by means of a professional device, for example by means of a 3D scanner, preferably used by a health professional, for example by an orthodontist or in an orthodontic laboratory. In an orthodontic surgery the patient or the physical model of their teeth can advantageously be disposed in a precise position and the professional device can be improved. This results in a very precise initial reference model. The initial reference model preferably supplies information on the positioning of the teeth with an error of less than $5/10$ mm, preferably less than $3/10$ mm, preferably less than $1/10$ mm.

The initial reference model is then divided to define "initial" tooth models.

The division of a three-dimensional model into tooth models is a standard operation by which the model is divided in order to delimit the representation of one or more of the teeth.

The teeth models may for example be defined as described by way of example in the international application PCT/EP2015/074896.

The division may be partially automated.

FIG. 4 represents an example of a reference model in which the tooth models 32 have been divided (only the tooth models are represented; they are of different appearance in order to be more easily identifiable).

The initial reference model divided in this way can then be deformed by movement of the initial tooth models, preferably without modification of the initial tooth models, to simulate the effect of time between the initial time and the updated time, in particular to simulate the orthodontic treatment up to the updated time.

The time interval between the initial and updated times may be less than four weeks, less than two weeks, less than one week. This time interval may equally be greater than four weeks or greater than one month, for example if the aligner is not the first aligner used for the orthodontic treatment and the initial reference model was produced at the commencement of the treatment.

To carry out this updating of the initial reference model an updated image is preferably used, taken at the updated time, using an image acquisition device, preferably a mobile telephone, a so-called "connected" camera, a so-called "smart" watch, a tablet or a personal computer, fixed or portable, including an image acquisition system, such as a web cam or a camera.

The updated image is extra-oral.

A photokit 15 is preferably used, as illustrated in FIGS. 10 and 11. A kit of this kind preferably includes a support 17, a dental spreader 19 and an acquisition device, preferably a mobile telephone 21. The dental spreader 19 and the acquisition device are preferably fixed onto the support 17 in a removable manner.

The spreader 19 may have the features of conventional spreaders.

As represented in FIG. 11 (in which it has been separated from the support), it preferably includes a rim 23 extending around a spreader opening with axis X and arranged in such a manner that the lips of the patient can rest thereon, exposing the teeth of the patient through said spreader opening.

The spreader 14 may be fixed to the support by one or more attachments 27a and 27b, for example magnetic attachments.

The spreader preferably includes lugs for spreading the cheeks 26a and 26b in order for the acquisition device fixed to the support to be able to acquire via the spreader opening photos of vestibular faces of teeth disposed at the back of the mouth, like molars. This feature is particularly advantageous for employing the methods described in PCT/EP2015/074897. Acquisition is preferably effected by the patient or someone close to the patient, but may be carried out by any other person, in particular a dentist or an orthodontist, preferably without imposing a precise positioning of the image acquisition device relative to the teeth.

The updated image is preferably a photograph or an image extracted from a video. It is preferably in color, preferably in real colors.

In one embodiment the updated image is an image of the teeth in the absence of the orthodontic aligner, termed a "bare updated image". This facilitates the updating of the initial reference model, the teeth being clearly visible in a bare updated image.

In another embodiment the patient wears the aligner during the acquisition of the updated image. In other words, the same image not only makes it possible to perceive the exterior contour of the aligner, and thus subsequently to make use of an aligner image, but also to determine the position of the teeth at the updated time to update the initial reference model.

The initial reference model is preferably updated on the basis of the updated image by means of an optimization algorithm. It may equally be effected by means of a neural network. The neural network may in particular be chosen from the list hereinafter.

An iterative process is preferably used in which, on each iteration, one or more tooth models are moved, after which optimum observation conditions of the initial model modified in this way (termed a "reference model under test") are determined, the optimal observation conditions being defined as the conditions enabling the reference model under test to be observed in such a manner that the view of said model is as close as possible to the updated image.

The steps c) to e) described in PCT/EP2015/074896 are preferably executed:
c) analyzing the updated image (also termed the "updated image" in PCT/EP2015/074896) and production of an updated map relative to an image feature;
d) optionally, determining, for the updated image, virtual acquisition conditions roughly approximating the real acquisition conditions of said updated image;
e) using the updated map, seeking an updated reference model corresponding to the positioning of the teeth during the acquisition of the updated image, preferably by means of a metaheuristic, preferably evolutionist, method, preferably by simulated annealing.

All the characteristics of the steps c) to e) described in PCT/EP2015/074896 are applicable. In the step c), the updated image is analyzed in such a manner as to produce an updated map relative to at least one image feature.

An "image feature" is a characteristic item of information that can be extracted from an image, conventionally by computer processing of that image.

An image feature may have a varying number of values. For example, a contour item of information may be equal to one or zero according to whether a pixel belongs or not to a contour. An item of brilliance information may assume a large number of values. The processing of the image enables extraction and quantization of the image feature.

The updated map represents an image feature in the frame of reference of the updated image.

The image feature is preferably chosen from the group consisting of a contour image feature, a color image feature, a density image feature, a distance image feature, a brightness image feature, a saturation image feature, a reflection image feature, and combinations of those image features.

In the optional step d) there are roughly evaluated the real acquisition conditions of the updated image, that is to say the position and the orientation in space of the acquisition device relative to the teeth and its calibration. The step d) advantageously enables limitation of the number of tests on virtual acquisition conditions in the step e) and therefore enables considerable acceleration of the step e).

One or more heuristic rules are preferably used. For example, there are preferably excluded virtual acquisition conditions liable to be tested in the step e), and conditions that correspond to a position of the image acquisition device behind the teeth or a distance from the teeth greater than 1 m. In a preferred embodiment markers represented in the updated image are used to determine a substantially conical region of space, or "test cone", delimiting virtual acquisition conditions liable to be tested in the step e).

The objective of the step e) is to modify the initial reference model to obtain an updated reference model that corresponds to the updated image. The updated reference model is therefore ideally a digital three-dimensional reference model from which the updated image could have been taken if that model had been real.

Thus a succession of reference models "under test" are tested, the choice of a reference model under test preferably depending on the level of correspondence of the reference models "under test" previously tested using the updated image. This choice is preferably made in accordance with a known optimization method, in particular chosen from metaheuristic optimization, preferably evolutionist, methods, in particular simulated annealing methods.

The optimization methods described in PCT/EP2015/074896 are in particular usable.

The step e) preferably includes the following steps:
e1) definition of a reference model under test as being the initial reference model, then,
e2) in accordance with the following steps, testing virtual acquisition conditions using the reference model under test in order closely to approximate said real acquisition conditions;
e21) determination of virtual acquisition conditions under test;
e22) production of a two-dimensional reference image of the reference model under test under said virtual acquisition conditions under test;
e23) processing of the reference image to produce at least one reference model representing said image feature at least partially;
e24) comparison of the updated and reference maps in such a manner as to determine a value for a first evaluation function, said value for the first evaluation function depending on the differences between said updated and reference maps and corresponding to a decision to continue or to halt the search for virtual acquisition conditions approximating said real acquisition conditions of the updated image with greater exactness than said virtual acquisition conditions under test determined on the last iteration of the step e21);

e25) if said value for the first evaluation function corresponds to a decision to continue said search, modification of the virtual acquisition conditions under test, after which returning to the step e22);

e3) determination of a value for a second evaluation function, said value for the second evaluation function depending on the differences between the updated and reference maps under the virtual acquisition conditions best approximating said real acquisition conditions and resulting from the last iteration of the step e2), said value for the second evaluation function corresponding to a decision to continue or to halt the search for a reference model approximating the positioning of the teeth during the acquisition of the updated image with more exactness than said reference model under test used on the last iteration of the step e2), and if said value for the second evaluation function corresponds to a decision to continue said search, modification of the reference model under test by moving one or more tooth models, after which returning to the step e2).

The steps e1) to e3) are described in detail in PCT/EP2015/074896 and WO2016066651.

The updated reference model obtained after the step e) is a very precise three-dimensional model resulting from successive modifications of the initial reference model. It is therefore advantageously itself very precise, although it has been obtained from simple photographs taken with no particular precautions.

In that the teeth are substantially undeformable, the movement of the tooth models of the initial reference model enables an updated reference model to be obtained that can be observed under observation conditions in which the view of the updated reference model is compatible with the updated image. In other words, this view may be superimposed "in register" on the updated image in such a manner that the teeth represented in the view and in the updated image are superimposed substantially exactly.

The updating of the initial reference model may be refined by repeating the previous operations with a plurality of updated images. It leads to an updated reference model that represents the teeth substantially in their configuration at the updated time.

Acquisition of the Aligner Image

Independently of the production of the updated reference model, there is acquired at the updated time an aligner image 36, that is to say an image of the arch of the patient wearing the aligner.

The aligner image is preferably acquired like the updated image described hereinafter, preferably using a mobile telephone, and preferably using an acquisition kit including a support to which are fixed the mobile telephone and a dental spreader like that described hereinabove.

The aligner image is extra-oral.

Framing

Conditions are then sought enabling observation of the updated reference model that correspond to the conditions of observation of the teeth of the patient from which the aligner image has been acquired. These conditions, termed "framed observation conditions", enable observation of the updated reference model in such a manner that the view of said model is as close as possible to the aligner image.

Seeking framed observation conditions virtually leads to movement around the updated reference model until a "framed" position is found that is compatible with the aligner image, that is to say in which teeth or parts of teeth can be observed as they would have been represented in the aligner image if the aligner had been transparent.

To this end, it is generally possible to identify in the aligner image markers the positions of which in the updated reference model are known.

By default, it is possible to acquire a new aligner image and to resume the search for such markers.

The markers preferably belong to teeth that are known to be immobile, for example because they are not being treated (if such teeth can be seen in the aligner image) or to parts of the aligner in contact with such teeth, and therefore also immobile. The immobile teeth can be easily identified because these are teeth the tooth model of which was not moved during the preceding step. In one embodiment the markers are gum contours.

At least three non-aligned points are preferably used as markers. The analysis of the distances between the representations of these markers in the aligner image then enables evaluation of the framed observation conditions by simple calculation.

In the view of the updated reference model under the framed observation conditions the markers have relative positions identical to those that they have in the aligner image.

Instead of using markers, framed observation conditions can be sought by means of a known optimization method, in particular chosen from metaheuristic, preferably evolutionist, optimization methods, in particular among simulated annealing methods.

In particular the optimization methods described in PCT/EP2015/074896 are useful.

The above methods advantageously enable guidance of the virtual movement around the updated reference model until a maximum agreement is obtained between the view observed by the virtual image acquisition device and the aligner image.

In one embodiment the following steps are executed:

i. analysis of the aligner image and production of a "aligner" map relative to an image feature;

ii. determination of virtual acquisition conditions under test;

iii. acquisition of a view of the updated reference model under said virtual acquisition conditions under test;

iv. processing of the view to produce at least one reference map representing said image feature at least partially;

v. comparison of the aligner and reference maps in such a manner as to determine a value for an evaluation function, said value depending on the differences between said aligner and reference maps and corresponding to a decision to continue or to halt the search for virtual acquisition conditions approximating said real acquisition conditions of the aligner image with more exactitude than said virtual acquisition conditions under test determined in the last iteration of step ii;

vi. if said value for the evaluation function corresponds to a decision to continue said search, modification of the virtual acquisition conditions under test, followed by returning to step iii, otherwise, determination of the framed observation conditions as being the last virtual acquisition conditions tested.

The representation of the aligner in the aligner image is preferably abstracted in the step i. Preferably only the contours of the teeth visible in the aligner image are considered.

The search leads to framed observation conditions of the updated reference model that offer a framed view in which the representations of the teeth can be superimposed in register with the representations of the teeth in the aligner image, that is to say in such a manner that the teeth represented in the framed view and in the aligner image are superimposed substantially exactly.

As an alternative to using markers, the search for framed observation conditions may be carried out by means of a neural network.

A "neural network" or "artificial neural network" is a set of algorithms well known to the person skilled in the art. The neural network may be in particular chosen from:
- networks specializing in the classification of images, known as convolutional neural networks (CNN), for example
  - AlexNet (2012)
  - ZF Net (2013)
  - VGG Net (2014)
  - GoogleNet (2015)
  - Microsoft ResNet (2015)
  - Caffe: BAIR Reference CaffeNet, BAIR AlexNet
  - Torch: VGG_CNN_S, VGG_CNN_M, VGG_CNN_M_2048, VGG_CNN_M_10 24, VGG_CNN_M_128, VGG_CNN_F, VGG ILSVRC-2014 16-layer, VGG ILSVRC-2014 19-layer, Network-in-Network (Imagenet & CIFAR-10)
  - Google: Inception (V3, V4)
- networks specializing in the location and detection of objects in an image, Object Detection Networks, for example:
  - R-CNN (2013)
  - SSD (Single Shot MultiBox Detector: Object Detection network), Faster R-CNN (Faster Region-based Convolutional Network method: Object Detection network)
  - Faster R-CNN (2015)
  - SSD (2015).

The framed observation conditions are substantially identical to the real acquisition conditions at the time at which the aligner image was acquired. By observing the updated reference model under the framed observation conditions the teeth are therefore seen at the time at which the aligner image was acquired. The view of the updated reference model under these framed acquisition conditions, or "framed view", is therefore comparable to the aligner image, but without the aligner. In particular, the shapes and the dimensions of the contours in the framed view are comparable to those of the contours of the teeth visible in the aligner image.

The exterior contour of the aligner 24 in the aligner image is however not perfectly comparable with the contours of the free edges of the teeth represented in the framed view.

In fact, the exterior contour of the aligner is not a mere translation of its interior contour. The objective of the step B) is to modify the updated reference model to obtain a contour better suited to a comparison with the exterior contour of the aligner.

In the step B), the tooth models 32 of the updated reference model (FIG. 6) are deformed as a function of the geometry of the aligner.

The geometry of the aligner is preferably evaluated in an idle position, before it is used.

The deformation is preferably determined as a function of the thickness of material between the interior surface of the aligner and the exterior surface of the aligner. The interior and exterior surfaces of the aligner may be determined at any time before the step B), preferably before the aligner is used.

The tooth models are preferably deformed so that the surfaces of these models that define the free edges of said models extend substantially along the exterior surface of the representation of the aligner if that aligner were modeled in the updated reference model in its position of service, in the absence of unseating.

The deformation preferably simulates a thickening, preferably a constant thickening, of the modeled teeth. The deformed tooth models 32' (FIG. 7) therefore represent the teeth initially modeled on the surface of which an additional layer of material had been deposited.

This deformation is similar to a swelling of the tooth models.

The thickening may be constant, for example equal to the average thickness of the aligner.

The thickening is preferably greater than 0.5 mm, preferably greater than 1 mm and/or less than 3 mm, preferably less than 2 mm.

In one embodiment the local deformation of a tooth model is determined as a function of the total thickness of the aligner.

"As a function of the geometry of the aligner" does not mean that the deformation applied has to be specific to each aligner. It may in particular be determined for a set of aligners having common characteristics, for example for all of the aligners produced by a manufacturer. In one embodiment the deformation is constant regardless of the place on the surface of the tooth model considered.

Each tooth model is preferably deformed individually, independently of the presence of the other tooth models. The deformations of the tooth models can therefore lead to the penetration of a tooth model into another adjacent tooth model. The deformed updated reference model obtained then no longer corresponds to any possible reality.

The union, or "fusion", of the deformed tooth models is delimited externally by a deformed support surface.

The deformation is preferably determined in such a manner that this deformed support surface has substantially the same shape as the exterior surface of the aligner if the aligner has a shape appropriate for the treatment in its service position. If the deformed support surface is not the same shape as the exterior surface of the aligner the dental situation is not perfectly suitable and the orthodontist may consider that it is abnormal and must be corrected.

The representation of the exterior surface of the aligner in the aligner image is termed the "aligner exterior contour" 24. The representation of the deformed support surface in the view of the deformed updated reference model under the framed observation conditions is termed the "deformed support contour" 30'. An unsuitable dental situation can therefore be detected by comparing these contours.

In the step C), a comparison of this kind is effected.

The deformed updated reference model is observed under the framed observation conditions and the deformed support contour in the framed view 38 obtained is determined. In an analogous manner, the aligner image is analyzed to determine the exterior contour of the aligner.

The person skilled in the art knows how to process an image or a view to isolate a contour.

This processing includes for example the application of well-known masks or filters supplied with image processing software. Such processing enables detection of regions of high contrast, for example.

Such processing in particular comprises one or more of the following known and preferred methods, namely:
- by application of a Canny filter, in particular to seek contours using the Canny algorithms;
- by application of a Sobel filter, in particular to calculate derivatives by means of the Sobel extended operator;

by application of a Laplace filter, to calculate the Laplacian of an image;
by detection of blobs in an image (Blobdetecor);
by application of a threshold to apply a fixed threshold to each element of a vector;
by resizing, using relations between the zones of pixels (Resize(Area)) or bi-cubic interpolations in the environment of the pixels;
by erosion of the image by means of a specific structuring element;
by dilating the image by means of a specific structuring element;
by retouching, in particular using regions in the vicinity of the restored zone;
by application of a bilateral filter;
by application of a Gaussian blurring;
by application of an Otsu filter, to seek the threshold that minimizes the inter-class variance;
by application of an A* filter, to seek a path between points;
by application of an adaptive threshold to apply an adaptive threshold to a vector;
by application of a filter to equalize a histogram of a grayscale images in particular;
by blur detection, to calculate the entropy of an image using its Laplacian;
by detection of contours (FindContour) of a binary image;
by filling colors (FloodFill), in particular to fill a connected element with a particular color.

The following non-limiting methods, although they are not preferred, may also be used:
by application of a MeanShift filter, in such a manner as to find an object in a projection of the image;
by application of a CLAHE (Contrast Limited Adaptive Histogram Equalization) filter;
by application of a Kmeans filter, to determine the center of clusters and of groups of samples around clusters;
by application of a DFT filter, in such a manner as to effect a discrete Fourier transform of a vector, direct or inverse;
by calculation of moments;
by application of a HuMoments filter to calculate invariants of Hu invariants;
by calculation of the integral of an image;
by application of a Scharr filter, enabling calculation of a drift of the image using a Scharr operator;
by seeking a convex envelope of points ("ConvexHull");
by seeking contour convexity points ("ConvexityDefects");
by comparison of shapes ("MatchShapes");
by verification if points are in a contour ("PointPolygonTest");
by detection of Harris contours ("CornerHarris");
by searching minimum Eigen values of matrices of gradients to detect corners ("CornerMinEigenVal");
by application of a Hough transform to find circles in a grayscale image ("HoughCircles");
by active contour modeling (tracing the contour of an object on the basis of a potentially "noisy" 2D image);
by calculation of a field of forces, termed a GVF ("gradient vector flow"), in a part of the image;
by "CascadeClassification".

The determination of the tooth contours can be optimized in accordance with the teachings of PCT/EP2015/074900.

The framed view after deformation is preferably superimposed in register on the aligner image in such a manner as to superimpose the elements common to the framed view after deformation and to the aligner image, for example the gum contours or visible tooth contours both in the framed view after deformation and in the aligner image. The aligner exterior contour and the deformed support contour are therefore positioned relative to one another.

In one embodiment the aligner exterior contour and the deformed support contour are divided up in such a manner as to define the portions of those contours of each tooth. The "exterior tooth contours" $24_i$ and "interior tooth contours" $30'_i$ are the portions of the aligner exterior contour and of the deformed support contour. The adjectives "interior" and "exterior" are used here only for clarity. In FIG. 12, the segments in dashed line separate the successive portions.

The comparison may then be effected by any means, and notably like the comparison of the interior and exterior tooth contours described in EP3412245.

In particular, for each of a plurality of teeth for which interior and exterior tooth contours have been determined, in particular, the following steps may be executed:
i) determination of a distance between the interior and exterior tooth contours;
ii) determination of a distance threshold, preferably from the distances determined in the step i);
iii) for each of said teeth, determination of a distance score as a function of:
the distance between the interior and exterior tooth contours, and
the distance threshold.

In the step i) a distance d is determined between the interior and exterior tooth contours of each of said teeth (FIG. 12).

The distance between the interior and exterior teeth contours of a tooth may for example be the average distance or the maximum distance between the pixels of said contours corresponding to the same point on the tooth.

The distance is preferably measured in pixels, which advantageously avoids having to establish a scale.

In the step ii) a distance threshold Sd is determined, preferably from the distances determined in the step i).

In the step ii), the distance threshold Sd is preferably substantially equal to the shortest ($d_{min}$) of the distances determined in the step i). At least one of the treated teeth is conventionally in contact with the bottom of the channel in which it is inserted. The distance between the interior and exterior tooth contours of that tooth is then equal to a minimum distance $d_{min}$ corresponding to a normal situation. It may therefore serve as a standard for evaluation, in the step iii), of the distances between the interior and exterior tooth contours of the other teeth.

In the step iii) a so-called "distance score" S(d,Sd) is determined for each of the teeth as a function of:
the distance d between the interior and exterior tooth contours, and
the distance threshold Sd.

The distance score for a tooth is preferably equal to (d−Sd), that is to say to the difference between the distance between the interior and exterior tooth contours of that tooth and the distance threshold. The higher the distance score, the farther has the tooth concerned been unseated from the channel.

FIG. 12 illustrates an example of the implementation of steps i) to iii) in which a tooth D1 is unseated from the bottom of the aligner and such that d−$d_{min}$>Sd.

For each of a plurality of teeth for which interior and exterior tooth contours have been determined, the following steps may equally be executed:

i') for each pair comprising a left-hand tooth and a right-hand tooth adjacent to at least one trio of first, second and third adjacent teeth for each of which interior and exterior tooth contours have been determined, the first and third teeth being adjacent to the second tooth, determination of an offset between the interior tooth contour of said left-hand tooth and the interior tooth contour of said right-hand tooth, termed the "interior offset", and determination of an offset between the exterior tooth contour of said left-hand tooth and the exterior tooth contour of said right-hand tooth, termed the "exterior offset", then determination of the difference between the interior offset and the exterior offset, termed the "offset difference";

ii') determination of an offset difference threshold, preferably from offset differences determined in the step i');

iii') determination, for at least one, preferably for each tooth of said trio, of at least one offset score, as a function of the offset difference with an adjacent tooth and the offset difference threshold.

In the step i'), there is considered at least one trio consisting of first, second and third teeth, D1, D2 and D3, respectively, the first and third teeth being adjacent to the second tooth, that is to say the first, second and third teeth lying in succession along an arch.

The interior tooth contours $30'_1$, $30'_2$ and $30'_3$ and exterior tooth contours $24_1$, $24_2$ and $24_3$, respectively, of the teeth D1, D2 and D3, respectively, are determined.

The respectively interior or exterior "offset" represents a distance between the interior or exterior tooth contours, respectively, of two adjacent teeth.

There are determined an offset between the interior tooth contour of said first tooth $30'_1$ and the interior tooth contour of said second tooth $30'_2$, termed the "first interior offset", $\Delta_{1-2}i$;

an offset between the interior tooth contour of said second tooth $30'_2$ and the interior tooth contour of said third tooth $30'_3$, termed the "second interior offset", $\Delta_{2-3}i$;

an offset between the exterior tooth contour of said first tooth $24_1$ and the exterior tooth contour of said second tooth $24_2$, termed the "first exterior offset", $\Delta_{1-2}e$;

an offset between the exterior tooth contour of said second tooth $24_2$ and the exterior tooth contour of said third tooth $24_3$, termed the "second exterior offset", $\Delta_{2-3}e$.

The interior offset between the interior tooth contours of two adjacent teeth is preferably equal to the greatest distance between the interior tooth contours of those two teeth.

The exterior offset between the exterior tooth contours of two adjacent teeth is preferably equal to the greatest distance between the exterior tooth contours of those two teeth.

The interior offsets and the exterior offsets are preferably measured in pixels, which advantageously avoids having to establish a scale.

There are then determined:

the difference between the first interior offset $\Delta_{1-2}i$ and the first exterior offset $\Delta_{1-2}e$, termed the "first offset difference" $\Delta_{1-2}$ $(=\Delta_{1-2}i-\Delta_{1-2}e)$;

the difference between the second interior offset $\Delta_{2-3}i$ and the second exterior offset $\Delta_{2-3}e$, termed the "second offset difference" $\Delta_{2-3}$ $(=\Delta_{2-3}i-\Delta_{2-3}e)$.

In the example from FIG. 12, $\Delta_{1-2}$ is much smaller than $\Delta_{2-3}$.

In the step ii') there is determined an offset difference threshold $S\Delta$, preferably from the first and second offset differences $\Delta_{1-2}$ and $\Delta_{2-3}$ determined in the step i').

In the step ii') the offset threshold is preferably substantially equal to the smaller of the offset differences determined in the step i').

Conventionally, at least two adjacent treated teeth are in contact with the bottom of the channel in which they are inserted. The offset difference between these two treated teeth is then substantially nil. This nil offset difference corresponding to a normal situation, and can therefore serve as a standard for evaluating the offset differences between the adjacent treated teeth.

In FIG. 13 the offset difference between the two teeth $D_1$ and $D_2$ is substantially nil.

In the step iii') at least one so-called "offset score" is determined for each pair of teeth of said trio as a function of the offset difference with a tooth adjacent to said tooth and the offset difference threshold.

In particular, the offset difference of the first tooth and the second tooth may be compared to the offset difference threshold $S\Delta$, for example zero. The offset difference threshold may in particular be subtracted from the offset difference of the first tooth and the second tooth to determine an offset score of the first and second teeth.

This offset score indicates for example, if it is positive, that one or each of the first and second teeth is liable to be unseated from the bottom of the channel.

In FIG. 13 the offset difference between the two teeth $D_2$ and $D_3$ is positive, which constitutes an indication of unseating of the second or third tooth.

In FIG. 13 the offset difference between the two teeth $D_1$ and $D_2$ being substantially nil, the positive offset difference between the two teeth $D_2$ and $D_3$ therefore indicates unseating of the third tooth.

Generally speaking, when a first offset score for the first and second teeth indicates unseating of one of those two teeth, a second offset score is determined for the second tooth and a third tooth adjacent to the second tooth. If the second offset score is less than the first offset score it is probable that it is the first tooth that has been unseated from the bottom of the channel. If not, it is probably the second tooth that has been unseated.

Generally speaking, in the step C) the shapes of said exterior surface and the deformed support surface are compared, after which the conformity score is determined as a function of the shape difference between said exterior surface and the deformed support surface. In other words, the conformity score represents this shape difference.

The person skilled in the art knows numerous ways of comparing the shapes of the exterior surface of the aligner and of the deformed support surface. In particular, they know numerous ways of calculating a conformity score representing this shape difference. In particular, the conformity score may be equal to an average distance between the two surfaces when they are optimally superimposed one on the other (with the "best fit").

The exterior surface of the aligner is preferably represented, for example in a 3D model or an image, after which the representation of the exterior surface of the aligner is compared to the deformed support surface. The representation of the exterior surface of the aligner may be generated at any time before its use, in the step B) or in the step C).

In particular, in the step C) a representation of said exterior surface may be positioned, or "registered", relative to the deformed support surface in such a manner as to superimpose in register at least one region of said representation with said deformed support surface, said region being a region covering, in the service position, at least one tooth of the support arch that has not been unseated from the aligner.

The registration may in particular consist in positioning the representation of the exterior surface above the deformed support surface and as close as possible to the deformed support surface. The portions of the deformed support surface representing teeth that have remained in contact with the interior surface of the aligner, that is to say that have not been unseated, then coincide with corresponding portions of the representation of the exterior surface of the aligner. The portions of the deformed support surface representing teeth that have been unseated are distanced from the corresponding portions of the representation of the exterior surface. The distance between these portions represents the unseating.

The conformity score can then be determined as a function of the distance between the representation of said exterior surface positioned in this way and the deformed support surface. For example, the distance between these surfaces may be measured at one or more points on the deformed support surface, preferably at all points on the deformed support surface. Said distance may be measured in pixels.

The score for the conformity of the aligner to the support arch is determined as a function of the result of the comparison, preferably as a function of said distances.

The score of the conformity of the aligner to the support arch can be determined considering one or more of the teeth.

The person skilled in the art knows numerous variants for calculating a conformity score.

In one embodiment, an "elementary" conformity score is calculated for a single tooth or preferably for each tooth of a plurality of teeth, preferably for each tooth represented at least partially by the support surface, after which the score of conformity of the aligner to the support arch is calculated from these elementary conformity scores. The elementary conformity scores advantageously enable location of the teeth that have become unseated, but also determination of the size of the unseating for each of those teeth.

For example, the elementary conformity score for one tooth may be equal, considering some or all of the points on the deformed support surface that represent said tooth, to the mean of the squares of the distances between the portion of the deformed support surface representing the tooth and the corresponding portion of the representation of the exterior surface of the aligner, after said registration has been effected. It may also be equal to the arithmetic mean of said distances.

Instead of the distances between the portion of the deformed support surface representing the tooth and the corresponding portion of the representation of the exterior surface of the aligner it is possible to use the distances of some or all of the points of the portion of the deformed support surface representing the tooth and corresponding points in the representation of the exterior surface of the aligner, relative to a reference object, for example a reference plane or a reference axis. For example, the elementary conformity score may be equal to the distance between the average distance, with the reference object, of the points of the portion of the deformed support surface representing the tooth, and the average distance, with the reference object, of the corresponding points of the representation of the exterior surface of the aligner.

The conformity score for a tooth may equally be evaluated by means of a neural network trained accordingly, preferably of the Siamese or regression network type. Such training does not represent any difficulty for the person skilled in the art.

The conformity score for a tooth may also be determined from a map of said distances, using all known techniques.

The conformity score for a tooth may further be evaluated in accordance with the methods described hereinabove, but comparing the convex envelopes of the representation of the exterior surface of the aligner and of the portion of the deformed support surface representing the tooth. The distances are then measured between these convex envelopes.

If the exterior surface of the aligner and the deformed support surface are represented in an image, the conformity score for a teeth may further be determined, after registration, by comparison of the contours of the teeth in the image representing the exterior surface of the aligner and representing the deformed support surface. The conformity score for the tooth can then for example be the difference between the times of these contours calculated using the Green formula or between the invariant times of those contours calculated with the Hu formula, or again by a distance from these two contours to the same polynomial function.

The score of conformity of the aligner to the support arch may be determined as a function of the elementary conformity scores, for example may be equal to the average of all the elementary conformity scores, or the smallest elementary conformity score.

The score of conformity of the aligner to the support arch may also be determined directly, without determining elementary conformity scores. The methods described hereinabove for the calculation of the elementary conformity scores may be used to determine the score of conformity of the aligner to the support arch directly, considering a plurality of, preferably all of, the teeth represented at least partially by the deformed support surface.

The comparison of the exterior surface of the aligner with the deformed support surface therefore makes it possible to detect, preferably to evaluate, any unseating of the aligner.

Information, for example an alert, is preferably sent to an operative to inform them, where appropriate, that the situation is abnormal. The information relating to a tooth depends on the conformity score. The information preferably includes a value for quantifying, for at least one tooth, the level of unseating of the aligner above that tooth, this value being preferably established on the basis of the elementary conformity score calculated for that tooth.

In one embodiment this information is used to establish a diagnosis and/or to modify the treatment, in particular to recommend a change of aligner and/or to determine the characteristics of a future aligner for the patient.

As is now clearly apparent, generally speaking, in the step A) a surface of the updated reference model is identified that carries (or "supports") the aligner. This identification, preferably effected by computer, is possible by any means. Thereafter, in the step B), this surface is deformed as a function of the predefined dimensional characteristics of the aligner, preferably its local thickness. In the step C) the deformed surface obtained is compared with the exterior surface of the aligner, for example by comparison of a view of the updated reference model deformed in this way with an image representing the aligner. It is thus possible to monitor possible unseating of the aligner.

A method in accordance with the invention therefore enables, on the basis of simple photos or a simple video, determination of the regions in which the aligner has moved away from the teeth and evaluation of the amplitude of that unseating. This evaluation is advantageously reliable, even if the aligner does not allow the teeth housed in the aligner to be distinguished.

The invention may be implemented by any electronic device having data processing capabilities. A device of this kind conventionally includes in particular a processor, a memory and communication buses. A computer program configured to employ a method of the invention is loaded into the memory. The electronic device preferably includes a human-machine interface conventionally including a screen, an Internet communication model, via WIFI, via Bluetooth® or via the telephone network. It may also be connected to a printer.

A method in accordance with the invention may in particular be implemented using a PC, a tablet, a mobile telephone or a server.

Of course, the invention is not limited to the embodiments described hereinabove and represented.

Generally speaking, in accordance with the invention, there may be carried out by any means a comparison of the exterior surface of the aligner with the deformed support surface.

These surfaces are preferably compared by comparing representations of these surfaces in the aligner image and in the view of the deformed updated reference model obtained under framed observation conditions, superimposable in register with the aligner image. However, in one embodiment, before the step C), a digital three-dimensional model, or "aligner model", is produced of at least the exterior surface of the aligner for example with a scanner, preferably while the aligner is in the service position, and, in the step C), the aligner model is compared directly with said deformed support surface.

Finally, the patient is not limited to a human being. In particular, the method in accordance with the invention may be used for another animal.

The invention claimed is:

1. A method of evaluation, by computer, at an "updated time", of the conformity of an orthodontic aligner to a dental arch of a patient on which said aligner bears, referred to as the "support arch", said aligner having an interior surface and an exterior surface, said method including the following successive steps:
   A) producing a digital three-dimensional model of the support arch, in its configuration at the updated time, or an "updated reference model", and determining, in the updated reference model, a support surface of the aligner, the support surface being a surface of the updated reference model that partially or completely models the surface of the support arch on which the aligner bears in the surface position;
   B) deforming the support surface, as a function of the thickness of material between the interior surface of the aligner and the exterior surface of the aligner to obtain a deformed support surface;
   C) comparing an exterior surface of the aligner with said deformed support surface in such a manner as to evaluate the difference between the exterior surface of the aligner and said deformed support surface, followed by determining, as a function of said difference, at least one score of conformity of the aligner to the support arch, the aligner including an interior surface opposite the exterior surface.

2. The method as claimed in claim 1, in which said deformation is of constant amplitude at all points of the support surface and/or is, at a point on the support surface, determined as a function of the distance between the interior surface and the exterior surface of the aligner at a point on the interior surface of the aligner intended, in a service position, to be in contact with said point on the support surface.

3. The method as claimed in claim 1, in which, in the step B), the support surface is deformed, preferably at least the part of the support surface that defines the free edges of the teeth of said arch, in such a manner that the deformed support surface extends substantially along the exterior surface of the representation of the aligner if that aligner were modeled in the updated reference model in the service position, in the absence of unseating of the aligner.

4. The method as claimed in claim 1, in which said deformation is a swelling of the support surface by an amplitude substantially equal to said distance between the interior surface (12) and the exterior surface of the aligner.

5. The method as claimed in claim 1, in which, in the step A), the updated reference model is divided in such a manner as to define, for each tooth represented in the updated reference model, a digital three-dimensional reference mode of said tooth, or "updated tooth model", and in which, in the step B), the surface of each updated tooth model is deformed to obtain a deformed tooth model, after which the deformed tooth models are merged and the deformed support surface is defined as being at least a part of the envelope of the assembly consisting of the merged deformed tooth models.

6. The method as claimed in claim 5, in which the deformation of the surface of an updated tooth model is a swelling of the updated tooth model, preferably of constant amplitude, and/or is, at a point on the surface of an updated tooth model, determined as a function of the distance between the interior and exterior surfaces of the aligner at a point on the interior surface of the aligner intended, in a service position, to be in contact with said point on the surface of the updated tooth model.

7. The method as claimed in claim 1, in which, in the step A), an image of the aligner is taken at the updated time, in a service position in which it is carried by said support arch, or "aligner image", a contour of the exterior surface of the aligner, or "aligner exterior contour", represented on the aligner image, is determined and "framed" observation conditions are sought offering a "framed" view of the updated reference model showing maximum agreement with the representations of the teeth in the aligner image, and in which, in the step C), the aligner exterior contour is compared with a contour of the deformed support surface, or "deformed support contour" represented in a view of the deformed updated reference model observed under the framed observation conditions.

8. The method as claimed in claim 1, in which an initial reference model at an initial time before the updated time is created, after which the initial reference model is divided in such a manner as to define, for each tooth represented in the initial reference model, a digital three-dimensional reference model of said tooth, or "initial tooth model", after which the initial tooth models are moved to produce the updated reference model in the step A).

9. The method as claimed in claim 8, in which the initial tooth models are moved until there is obtained an updated reference model compatible with at least one updated image of the support arch, the updated image being acquired less than one month before the updated time, the updated image representing the aligner or not.

10. The method as claimed in claim 7, in which the time interval between the updated time and the initial time is greater than one week, and/or the time interval between the initial time and the commencement of an orthodontic treatment of the patient with aligners is less than one month or than one week, the updated time occurring during said orthodontic treatment.

11. The method as claimed in claim 9, in which, in the step C), before comparing the aligner exterior contour and the deformed support contour there are superimposed in register the representation of an element in the updated image and the representation of said element in the aligner image, the element being an element that is not modified by wearing the aligner, preferably a gum contour.

12. The method as claimed in claim 1, in which the updated reference model or the initial reference model is produced using a scanner.

13. The method as claimed in claim 7, in which the aligner image is acquired with a mobile telephone or in which the updated image is acquired with a mobile telephone.

14. The method as claimed in claim 1, in which, in the step C), the conformity score is determined as a function of the shape difference between said exterior surface and the deformed support surface.

15. The method as claimed in claim 1, in which, in the step C), a representation of said exterior surface is positioned relative to the deformed support surface in such a manner as to superimpose in register at least one region of said representation with said deformed support surface, said region being a region covering, in the service position, at least one tooth of the support arch not unseated from the aligner, after which the conformity score is determined as a function of the distance between the representation of said exterior surface positioned in this way and the deformed support surface.

16. The method as claimed in claim 15, in which an elementary conformity score is determined for each of at least some of the teeth represented, at least partially, by the support surface, and preferably for each of said teeth, and the conformity score of the aligner to the support arch is determined as a function of said elementary conformity score or scores.

17. The method as claimed in claim 1, in which, in the step C), the conformity score is determined by means of a neural network.

18. A method of manufacturing an orthodontic aligner, in which method there is employed a method of evaluating a first aligner as claimed in claim 1, after which, as a function of the conformity score obtained by said evaluation, a second aligner is manufactured.

* * * * *